United States Patent [19]

Six

[11] 4,338,511
[45] Jul. 6, 1982

[54] ELECTRONIC THERMOSTAT EQUIPPED WITH AN ENERGY-SAVING DEVICE

[75] Inventor: Jean-Claude G. Six, Versailles, France

[73] Assignee: U.S. Philips Corporation, New York, N.Y.

[21] Appl. No.: 29,791

[22] Filed: Apr. 13, 1979

[30] Foreign Application Priority Data

Apr. 13, 1978 [FR] France .................. 78 10915

[51] Int. Cl.³ .............................................. H05B 1/02
[52] U.S. Cl. .................................. 219/497; 219/501; 219/510; 219/515; 236/1 R; 340/589
[58] Field of Search ............. 219/494, 497, 499, 501, 219/509, 511, 510, 515; 236/1 R, 1 C; 340/584, 589, 588

[56] References Cited

U.S. PATENT DOCUMENTS

| | | | |
|---|---|---|---|
| 3,443,121 | 5/1969 | Weisbrod | 219/497 |
| 3,729,735 | 4/1973 | Dageford | 236/1 R |
| 3,821,516 | 6/1974 | Hayes et al. | 219/497 |
| 4,035,796 | 7/1977 | Hedley et al. | 236/1 R |
| 4,088,871 | 5/1978 | Coulmance et al. | 219/501 |

FOREIGN PATENT DOCUMENTS 2263018  7/1974  Fed. Rep. of Germany ...... 219/241

Primary Examiner—B. A. Reynolds
Assistant Examiner—M. H. Paschall
Attorney, Agent, or Firm—Thomas A. Briody; Robert T. Mayer; Bernard Franzblau

[57] ABSTRACT

An energy-saving electronic thermostat operates by means of a single temperature probe. The rapid decrease in temperature of the probe when a window is opened causes the heating to be switched off or reduced by means of a comparator circuit combined with a network having a large time-constant. The device is employed in a fixed or mobile electric heating convector.

16 Claims, 8 Drawing Figures

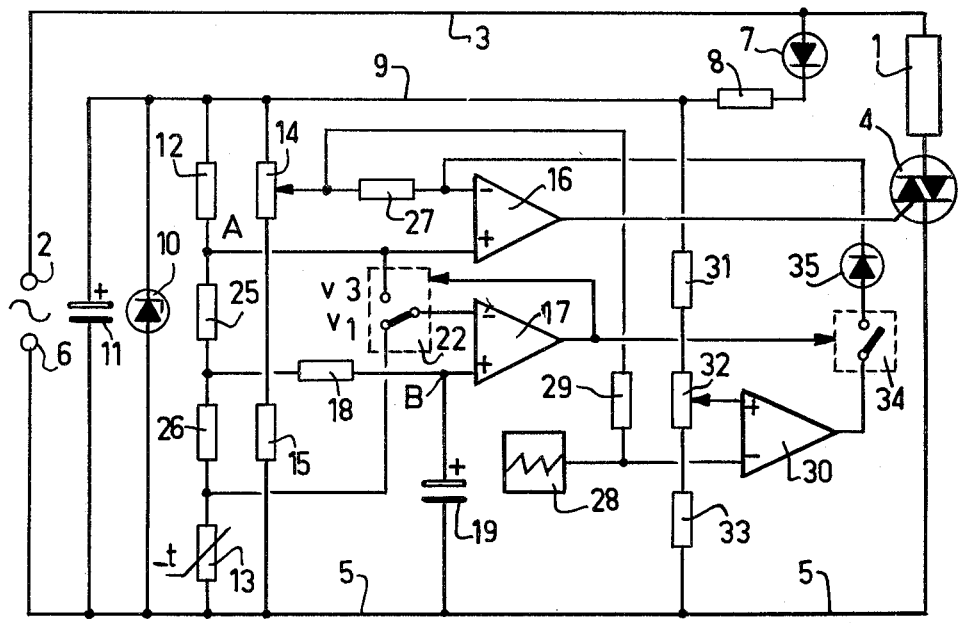
Fig.6
Fig.7
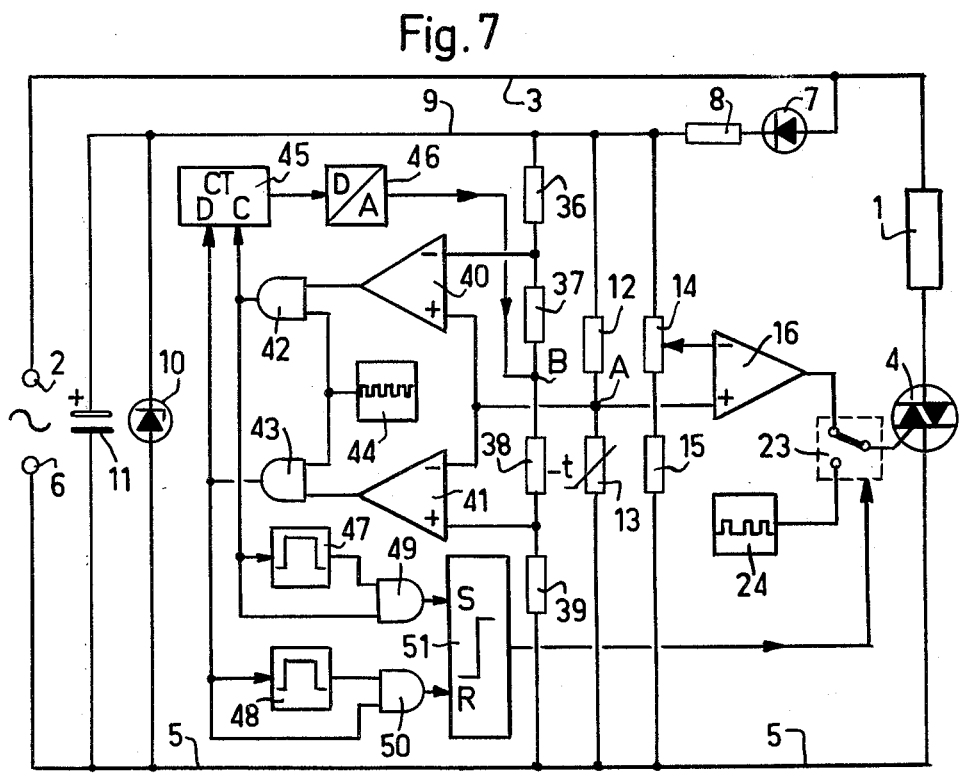

ELECTRONIC THERMOSTAT EQUIPPED WITH AN ENERGY-SAVING DEVICE

The invention relates to an electronic thermostat equipped with an energy-saving device and with a temperature probe and a voltage comparator circuit which is coupled to the control electrode of a static circuit breaker, which circuit breaker is connected in series with a mains-powered load.

The invention particularly, though not exclusively, relates to fixed or mobile electric heating convectors (heat radiators) in which the electronic thermostat and its temperature probe are incorporated in the apparatus in order to avoid the use of any leads other than that necessary for connecting the heating element to the AC energy supply.

The operation of an electronic thermostat is well-known: variations of the probe temperature are converted into voltage variations which, by means of a comparator circuit, control the on-state and the off-state of a triac which is connected in series with the heating resistance.

When the user opens the window of the room in which the convector or heat radiator is located, it is evident that this leads to a waste of energy. Indeed, when a room is heated by a thermostat-controlled convector, the energy taken from the AC supply is equal to that necessary to compensate for the loss of heat. When a window is opened in order to air the room, the losses increase and the power delivered by the convector increases. If the loss is very high, the control range of the thermostat is exceeded, the power delivered is a maximum and the temperature of the room decreases further.

U.S. Pat. No. 4,088,871 describes a device which is adapted to cooperate with an electronic thermostat and which limits the power demanded by the convector when a window is opened.

The operation of this device requires a second temperature probe located outside of the room, which complicates the installation of fixed convectors to a certain extent and which is impracticable when mobile convectors are used.

It is one of the objects of the invention to provide the electronic thermostat with a circuit which enables the heating to be switched off or the average electric power produced by the heating apparatus to be limited when the temperature of the room to be heated decreases rapidly.

It is a further object of the invention to obtain said result by using the temperature probe of the electronic thermostat as a means of controlling the energy-saving circuit.

The invention is based on the recognition that opening the window of a room being heated will temporarily cause a rapid decrease of the ambient temperature before the intake of power, as a result of the control action, has had time to heat the air again.

According to the invention, an electronic thermostat equipped with an energy-saving device and with inter alia a temperature probe and a voltage comparator circuit, which is coupled to the control electrode of a static circuit and breaker, connected in series with a mainspowered load, is characterized in that a switching means responsive to a rapid decrease of the probe temperature is included in the connection to the control electrode of the static circuit breaker.

In a first embodiment of the energy-saving device in accordance with the invention the switching means are actuated by an analog subassembly by means of a network with a large time constant and a voltage comparator circuit.

In a second embodiment of the device in accordance with the invention the switching means are actuated by a digital subassembly by means of a combination of logic circuits, which comprises two voltage comparators, one clock generator, a plurality of gates, two monostable multivibrators, one bistable multivibrator, a reversible counter and a digital-analog converter.

Depending on the situation the switching means either disconnect the load completely in the case of a rapid decrease of the probe temperature, or provide intermittent energization, i.e. with reduced power, under similar conditions. Opening the window of a room in which a convector is installed which is equipped with a thermostat in accordance with the invention immediately causes said convector to be switched off or to be operated at a reduced power level, but restoring the electronic thermostat to normal operation is not possible until the window has been closed.

In this way any waste of energy after a needless intake of power is avoided.

In its different embodiments and variants, the thermostat in accordance with the invention requires no connections other than those of a conventional thermostat so that it can be adapted to all types of convectors, no matter whether they are fixed or mobile.

In the first embodiment, which is of the analog type and which employs discrete components, the increase in cost price as a result of the use of the energy-saving device is only a fraction of the total cost of the thermostat.

In the second embodiment, which is of the digital type, the actual energy-saving device can readily be integrated with all the consequent advantages that derive from mass production.

The invention will be described in more detail with reference to the accompanying drawing in which.

Figure 1:
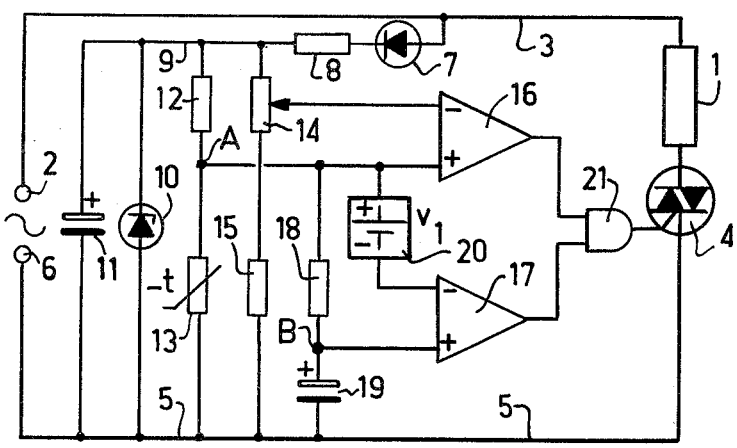
FIG. 1 shows the basic diagram, partly in block-schematic form, of a first embodiment of the analog type of an electronic thermostat equipped with the energy-saving device in accordance with the invention.
Figure 2:
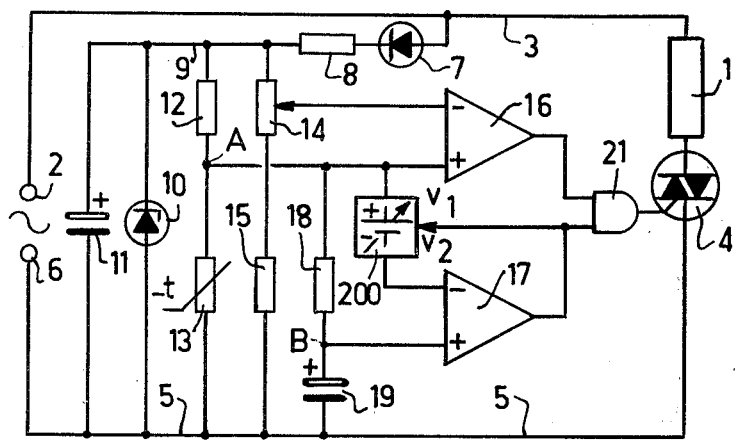
FIG. 2 shows the circuit diagram of a first practical variant of the first embodiment of the thermostat in accordance with the invention.
Figure 3A:
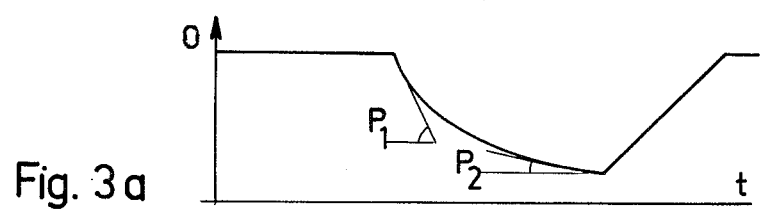
FIG. 3a represents the variation, as a function of time, of the temperature of a heated room with an open window.
Figure 3B:
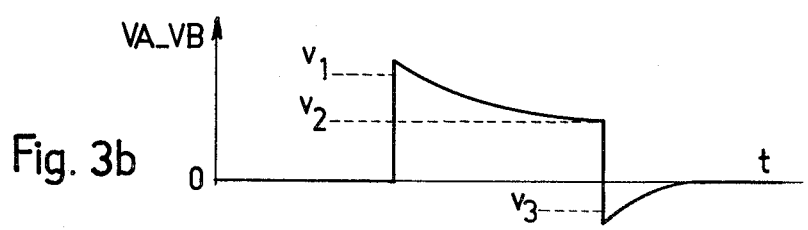

FIG. 3b, with the same time scale as in FIG. 3a, represents corresponding variations of the voltage between two points in the circuits of FIGS. 1 and 2.

Figure 4:
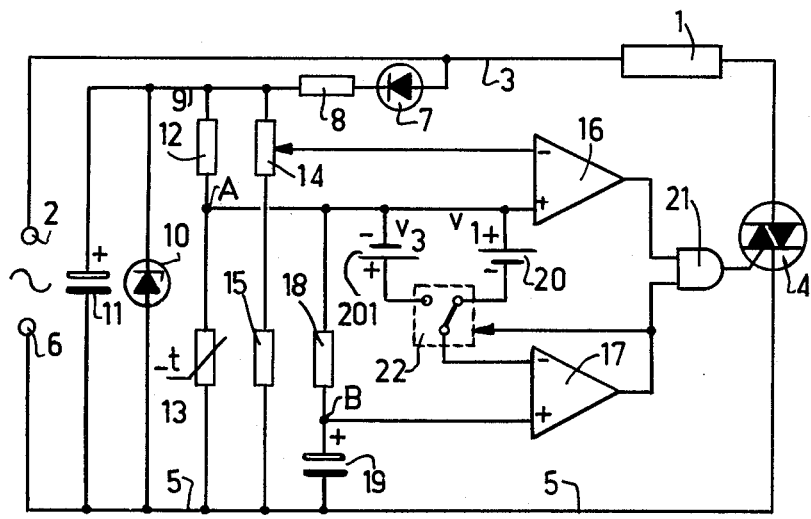

FIG. 4 shows the circuit diagram of a second variant of the first embodiment of the thermostat in accordance with the invention, which causes the heating to be switched off completely when the window is opened.

Figure 5:
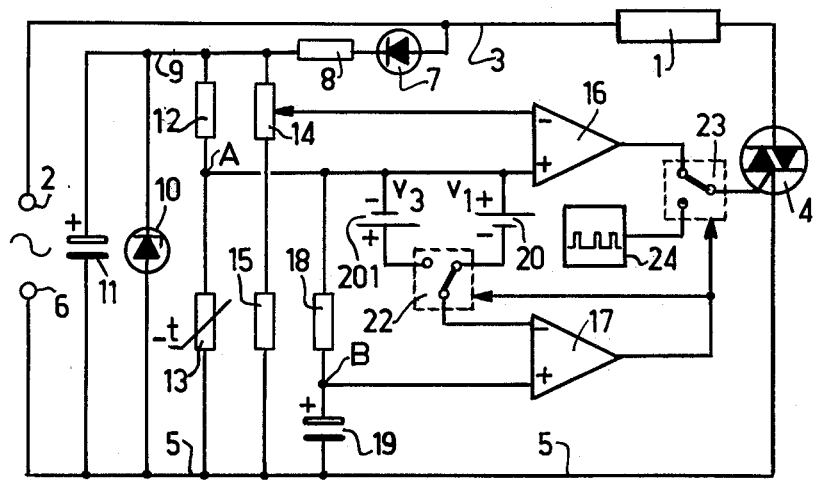

FIG. 5 shows the circuit diagram of a third variant of the first embodiment of the thermostat in accordance with the invention, which reduces the heating when the window is opened.

FIG. 6 shows a more detailed circuit diagram of the preferred embodiment of the thermostat of FIG. 5, and FIG. 7 shows the circuit diagram, partly in block-schematic form, of a schematic embodiment, of the digital type, of the energy-saving device with which the electronic thermostat in accordance with the invention is equipped.

In FIG. 1 the terminals of a heating convector 1 are connected to a mains terminal 2 by a lead 3 and to one of the electrodes of a controlled switch, for example a triac 4, the other triac electrode being connected to the other mains terminal 6 by a common conductor 5. The anode of a rectifier diode 7 is connected to the conductor 3, while the cathode is connected to a positive conductor 9 via a resistor 8.

Between the common conductor 5 and the positive conductor 9 there are included, in this order, a zener diode 10, a smoothing capacitor 11, two voltage dividers, the first divider comprising a fixed resistor 12 and a thermistor 13, and the second divider comprising a potentiometer 14 and a fixed resistor 15.

The positive input of a first comparator circuit 16 is connected to a point A common to the resistors 12 and 13, while the negative input is connected to the wiper of the potentiometer 14.

The positive input of a second comparator circuit 17 is connected to a point B common to a resistor 18 in series with an electrolytic capacitor 19 which is included between point A and the common conductor 5.

The negative input of the comparator 17 is connected to the negative terminal of a voltage source 20, the positive terminal of said source being connected to point A.

The outputs of the comparator circuits 16 and 17 are connected to the two inputs of an AND-gate 21, whose output is coupled to the control electrode of the triac 4.

If, for the time being, the presence of the energy-saving device in accordance with the invention is ignored, the electronic thermostat of FIG. 1 operates in known manner. The circuit 16 compares a fixed reference voltage, which is adjustable by the potentiometer 14, with a voltage at point A whose value can vary as a function of the temperature of the thermistor 13. If the temperature of the probe 13 decreases, the voltage at point A increases and the comparator circuit 16 supplies a trigger signal to the gate of the triac 4, as a result of which power is applied to the convector 1. The resulting rise in temperature causes the resistance of the probe 13 and thus the voltage at point A to decrease, and the triac 4 is turned off.

The temperature of the room being heated is then stabilized at a value which depends on the position of the wiper of the potentiometer 14, for example at 20° C., the average power delivered by the convector 1 compensating for the loss of heat from the room.

If the loss of heat increases abruptly, for example because a window is opened, the average power delivered by the convector 1 will increase substantially so that a new state of equilibrium is established. If the losses become greater than the supply of heat, the convector 1 is energized permanently and the waste of energy is a maximum if the user does not close the window.

The energy-saving device in accordance with the invention prevents such a situation. It comprises the comparator circuit 17, the RC integrating network 18–19 having a large time constant, and the voltage source 20 with a threshold voltage v1.

During normal operation the temperature of the room being heated is constant (beginning of FIG. 3a) and the voltage difference between points A and B is substantially zero (FIG. 3b). The voltage variations at point A are very slow and are substantially followed by point B.

In this situation the comparator circuit 17 permanently supplies a signal which keeps the gate 21 open to the periodic control signals supplied to the triac from the comparator circuit 16.

When a window is opened, the temperature of the room initally drops abruptly in accordance with a steep slope P1 (FIG. 3a), and subsequently more slowly in accordance with a slope P2.

The voltage at point A increases rapidly, while the voltage at point B first remains substantially constant and equal to the voltage previously appearing at point A. The voltage difference VA-VB becomes greater than the threshold voltage v1 (FIG. 3b) and the comparator 17 changes over, closing the gate 21 to the trigger signal supplied to the triac from the comparator circuit 16.

The voltage at point B then tends to catch up with that at point A at a rate which depends on the time constant of the RC-circuit, and at the instant at which VA-VB becomes smaller than v1, the comparator 17 changes over and gate 21 is opened again.

If the time during which the voltage VA-VB remains higher than v1 is to be prolonged sufficiently to induce the user to close the window, which time is of the order of several tens of minutes, the RC-time should be very large, which requires the use of a capacitor 19 of very high value, which is bulky and not very reliable.

In FIG. 2, in which the reference numerals correspond to those of FIG. 1, the use of a capacitor 19 of very high value is avoided by the presence of the reference voltage source 200. The voltage source 200 has a voltage which varies between the value v1 during normal operation and a value v2, smaller than v1, when the comparator circuit 17 has changed over. The change between the two voltages is obtained by feedback from the output of the comparator to a voltage-variation control terminal. Thus, the comparator 17 is restored to the normal state when the voltage VA-VB becomes smaller than the voltage v2 (FIG. 3b), at an instant corresponding to a smaller slope P2 of the drop in room temperature (FIG. 3a).

In the two embodiments just described, restoring to normal operation is effected after a longer or a shorter time if the window remains opened because the voltage time at point B always becomes smaller than the voltage v1 or v2. This constitutes no problem if the user remains in the room because the rapid drop in ambient temperature will induce him to close the window.

This is not the case if the user leaves the room after having opened the window. In that case, after an off-period of some tens of minutes, the convector 1 will again be energized at full power as long as the window remains open. Such a situation can be avoided by the use of the circuit of FIG. 4.

In FIG. 4, in which the reference numerals correspond to those used in FIGS. 1 and 2, a further source 201 of reference voltage v3, with a polarity opposed to that of the first reference source, is provided in addition to the source 20 of the reference voltage v1. These two sources can be connected alternately to the negative input of the comparator 17 by means of a single-pole electronic reversing switch 22, said switch being controlled via a conductor which is connected to the output of the comparator 17.

During normal operation the negative input of the comparator 17 is connected to the negative terminal of the source v1 in the same way as for the circuits in accordance with FIGS. 1 and 2, and the circuit 17 changes over if the voltage VA-VB is greater than v1 (FIG. 3b).

After the change-over of the circuit 17 the reversing switch 22 connects the source 201 to the negative input of the comparator 17 which then receives a positive reference voltage v3. In this situation restoring to normal operation is possible only if the voltage VA-VB exceeds the reference voltage v3 (FIG. 3b), i.e. if the voltage at point A decreases, which corresponds to a rise in temperature of the probe 13.

Normally closure of the window of the room causes a rise in ambient temperature which is sufficiently rapid to cause a return to normal operation.

However, in certain cases (cold walls, large rooms) the rate at which the ambient temperature increases may be too low to cause the comparator 17 to change over. Such a situation may be avoided by the use of the circuit of FIG. 5.

In FIG. 5, in which the reference numerals correspond to those used in FIGS. 1, 2 and 4, the AND-gate 21 of the preceding circuits is replaced by an electronic reversing switch 23, having a control input connected to the output of the comparator 17.

The gate of the triac 4 is connected to the master contact of the reversing switch 23. Of the two switching contacts one contact is connected to the output of the comparator 16 and the other contact is connected to a squarewave generator 24.

When the reversing switch 23 is in the "antiwastage" position, the gate of the triac 4 receives comparatively short squarewave voltage pulses such that the convector 1 dissipates a smaller power so that, after the window has been closed, the room temperature can be restored sufficiently rapidly.

In FIG. 6, in which the reference numerals correspond to those used in FIGS. 1, 2, 4 and 5, two resistors 25 and 26 are included between the resistor 12 and the thermistor 13. The connection which is common to the resistors 12 and 25 forms the point A, while the connection which is common to the resistors 25 and 26 is connected to point B via the resistor 18.

The two switching contacts of the electronic reversing switch 22 are respectively connected to point A and to the connection which is common to the thermistor 13 and the resistor 26. A resistor 27 is included between the wiper of the potentiometer 14 and the negative input of the comparator circuit 16.

The output of a sawtooth-voltage generator 28, operating at a very low frequency, is connected both to the wiper of the potentiometer 14 via a resistor 29 and to the negative input of a comparator circuit 30.

A voltage divider, comprising a first resistor 31, a potentiometer 32 and a second resistor 33, is disposed between the conductors 9 and 5, the positive input of the comparator 30 being connected to the wiper of the potentiometer 32.

The output of the comparator 30 is connected to one of the switching contacts of an electronic circuit breaker 34 having a control input coupled to the output of the comparator 17, the other contact being connected to the anode of a diode 35 which has a cathode connected to the negative input of the comparator 16.

The circuit of FIG. 6 employs an electronic thermostat which is designed around an integrated circuit which is commercially available from N. V. Philips Gloeilampenfabrieken under the reference TCA 280 A or TDA 1023. This type of circuit comprises a ramp generator 28 whose ramp voltage is partly applied to the wiper of the potentiometer 14. The same ramp generator is employed for supplying the reduced power to the convector 1 when the window is open. To this end the ramp voltage from the generator 28 is compared with a fixed direct voltage supplied by a voltage divider by means of the circuit 30. The circuit 30 consequently supplies squarewave voltage pulses at its output whose width is adjustable by means of the potentiometer 32.

In the "anti-wastage" position the electronic circuit breaker 34 is closed and the squarewave pulses from the comparator 30 are applied to the negative input of the comparator 16 via the diode 35 so that corresponding trigger pulses are applied to the triac 4, the average power dissipated by the convector 1 being adjustable by means of the potentiometer 32.

The sources of opposite polarity 20 and 201 in FIG. 5 are replaced by an auxiliary voltage divider 25-26, which is included in the main voltage divider 12-13 of the temperature probe, the voltage v1 being available across the resistor 26 and the voltage v3 across the resistor 25.

In FIG. 7, in which the reference numerals correspond to those used in FIGS. 1, 2, 4, 5 and 6, the energy-saving device associated with the electronic thermostat is a combination of digital circuits which cooperate with a resistor chain 36, 37, 38 and 39 disposed between the positive conductor 9 and the negative conductor 5. Two interconnected inputs of opposite polarity of the two comparator circuits 40 and 41 are connected to point A, the negative input of the circuit 40 being connected to the point which is common to the resistors 36 and 37, while the positive input of the circuit 41 is connected to the point which is common to the resistors 38 and 39.

The outputs of the comparators 40 and 41 are respectively connected to an input of the two AND-gates 42 and 43, the two other interconnected inputs of said gates being connected to the output of a clock signal generator 44 having a repetition rate of approximately one second.

The outputs of the gates 42 and 43 are respectively connected to the count-up input C and to the count-down input D of a counter 45. The counter output is coupled to the input of a digital-analog converter 46, the output of said converter being connected to point B which is common to the resistors 37 and 38.

The outputs of the gates 42 and 43 are respectively connected to the inputs of two monostable multivibrators 47 and 48 having a period of approximately 10 seconds as well as to the first inputs of two AND-gates 49 and 50, the other inputs of said gates being respectively connected to the outputs of the multivibrators 47 and 48.

The outputs of the gates 49 and 50 are respectively coupled to the S and R inputs of a bistable multivibrator 51 which has an output connected to the control input of the electronic reversing switch 23.

The resistor chain 36, 37, 38 and 39 is proportioned so that the voltage at point B is substantially equal to that at point A during normal operation. In this situation the comparators 40 and 41 are not actuated, the gates 42 and 43 are closed and the output state of the multivibrator 51 is such that the electronic reversing switch 23 connects the output of the comparator 16 to the gate of the triac 4.

When a window is opened, the voltage at point A increases and becomes greater than the switching threshold of the comparator 40. The gate 42 opens and the clock pulses from the generator 44 are applied to the count-up input C of the counter 45.

Simultaneously the first clock pulse drives the monostable 47 for 10 seconds. In this situation, if the slope with which the voltage at point A increases is such that a second counting pulse is applied to the gate 49 before the end of the period of the monostable 47, said gate opens and the S-input of the bistable multivibrator 51 receives a pulse which sets the output to such a state that that the electronic reversing switch 23 is switched to the "anti-wastage" position, i.e. the gate of the triac is connected to the generator 24.

At the same time the digital-analog converter 46 converts the pulse count at the output of the counter 45 into a rising voltage ramp which causes the voltage at point B to increase.

When the voltage across points A and B becomes smaller than the switching threshold of the comparator 40, this comparator is reset, the gate 42 closes and counting ceases. After the 10-second period of the monostable 47 the entire circuit remains in the same state as long as the window is open.

A temperature rise after the window is closed reduces the voltage at point A relative to point B. When the switching threshold of the comparator 41 is reached, the gate 43 opens and the clock pulses from the generator 44 are simultaneously applied to the countdown input D of the counter 45 and to the input of the monostable 48, which multivibrator is actuated for a period of 10 seconds by said pulses.

If a second pulse is applied to the gate 50 before the end of the period of the monostable 48 said gate opens, in a similar way as for the monostable 47 and the gate 49, and the R-input of the bistable multivibrator 51 receives a signal which brings the output of said bistable to such a state that the electronic reversing switch 23 is set to the normal control position.

Simultaneously, the count-down of the counter 45 results in a falling voltage ramp at the output of the converter 46, as a result of which the voltage at point B more closely approximates the voltage at point A. When the difference between these two voltages become smaller than the switching threshold of the comparator 41, this comparator is reset to the initial state, the gate 43 closes and counting down is discontinued after the 10-second period of the monostable 48, the entire circuit being rendered inoperative and heating control being effected normally.

In the embodiment of the energy-saving device just described, the combination of the counter 45 and the converter 46 performs the function of the circuit 18, 19 with the large time constant in the preceding versions. This enables extensive integration of the device, which may be accommodated in a casing with four external connections, namely the ends of the resistors 36 and 39, point A and the output of the bistable multivibrator 51.

It is evident that the digital energy-saving device of FIG. 7 may be combined with an electronic ramp-voltage thermostat such as that described with reference to the righthand part of the diagram of FIG. 6. It is also obvious that the electronic switch 23 may be replaced by the gate 21 of FIGS. 1, 2 and 4, if the load 1 is to be switched off completely when the window is open.

What is claimed is:

1. An electronic thermostat equipped with an energy saving device comprising, a temperature probe, a static circuit breaker having a control electrode for controlling its operation, a first voltage comparator circuit having one input coupled to the temperature probe, a second input coupled to a source of reference voltage and an output, a pair of input terminals for connection to a source of electric power, a load, means connecting the circuit breaker in series with the load across said input terminals, switching means, a second voltage comparator circuit having a first input coupled to said one input of the first comparator circuit via a threshold voltage source and an output connected to the switching means, means coupling the output of the first comparator circuit to the control electrode of the static circuit breaker via said switching means, and means coupling a second input of the second voltage comparator circuit to said one input of the first comparator circuit via a network having a large time constant so that the switching means is controlled by a signal developed in response to a rapid decrease in the temperature of the probe.

2. An electronic thermostat as claimed in claim 1 wherein said threshold voltage source includes a control input by means of which the threshold voltage is controlled to assume two voltage values depending on the state of the control input, and means connecting said control input to the output of the second comparator circuit.

3. An electronic thermostat as claimed in claim 1 wherein the threshold voltage source comprises two threshold-voltage sources of opposite polarity which are selectively switched between said one input of the first comparator circuit and said first input of the second comparator circuit by an electronic reversing switch having a control input, and means connecting the control input of the reversing switch to the output of the second comparator circuit.

4. An electronic thermostat as claimed in claim 3 wherein the two threshold voltage sources of opposite polarity comprise a resistor bridge included in a voltage dividing network which includes the temperature probe.

5. An electronic thermostat equipped with an energy-saving device comprising, a temperature probe, a static circuit breaker having a control electrode for controlling its operation, a first voltage comparator circuit having one input coupled to the temperature probe, a second input coupled to a source of reference voltage and an output, a pair of input terminals for connection to a source of electric power, a load, means connecting the circuit breaker in series with the load across said input terminals, switching means controlled by a signal developed in response to a rapid decrease in the temperature of the probe and independent of the actual value of the probe temperature, means coupling the output of the first comparator circuit to the control electrode of the static circuit breaker via said switching means, means connecting the switching means to an output of a bistable multivibrator having two inputs connected to a digital circuit via two AND gates, said digital circuit comprising two voltage comparator circuits, one clock generator, two further AND-gates coupled to the output of said clock generator, two monostable multivibrators, one reversible counter, means coupling said two further AND-gates to said two monostable multivibrators, respectively, to said two AND gates, respectively, and to first and second opposite counting inputs of the reversible counter, respectively, and one digital-analog converter having an input coupled to an output of the counter, two interconnected inputs of said two comparators being connected to the temperature probe, and the two other inputs being connected to a resistor bridge which is connected in parallel with a resistor network including the probe therein, and means coupling an output of the digital-analog converter to a point on said resistor bridge.

6. An electronic thermostat as claimed in claim 5, wherein the switching means comprise and AND-gate with two inputs and an output connected to the control electrode of the static circuit breaker, one of the inputs of said gate being coupled to the output of the first comparator circuit.

7. An electronic thermostat as claimed in claim 5 wherein the switching means comprise an electronic reversing switch having a master contact connected to the control electrode of the static circuit breaker and two switching contacts respectively connected to the output of the first comparator circuit and to an output of a squarewave generator.

8. An electronic thermostat as claimed in claim 6 wherein the other input of the AND gate is connected to the output of the bistable multivibrator.

9. An electronic thermostat as claimed in claim 7 wherein the electronic reversing switch includes a control input connected to said output of the bistable multivibrator.

10. An electronic thermostat as claimed in claim 7 wherein the squarewave generator comprises by the combination of a rampvoltage generator which forms part of the thermostat proper and a voltage comparator circuit having two inputs respectively connected to an output of the ramp voltage generator and to a resistor bridge which is connected in parallel with the resistor network of the temperature probe.

11. An electronic thermostat equipped with an energy-saving device comprising, a temperature probe, a static circuit breaker having a control electrode for controlling its operation, a voltage comparator circuit having one input coupled to the temperature probe, a second input coupled to a source of reference voltage and an output, a pair of input terminals for connection to a source of electric power, a load, means connecting the circuit breaker in series with the load across said input terminals, switching means controlled by a signal developed in response to a rapid decrease in the temperature of the probe and independent of the actual value of the probe temperature, and means coupling the output of the comparator circuit to the control electrode of the static circuit breaker via said switching means.

12. An apparatus for sensing and regulating the temperature of an enclosed area comprising, a temperature probe adapted to be located within said enclosed area so as to be responsive solely to the ambient temperature thereof, a pair of input terminals for connection to a source of electric energy, a controlled switch having a control electrode, means for connecting the controlled switch in series with a heating load across said input terminals, a voltage comparator having first and second inputs coupled to said temperature probe and to a source of reference voltage, respectively, and an output coupled to the control electrode of the controlled switch for controlling the on/off time of the switch, and a switching means controlled by a signal developed in response to a rapid decrease in the temperature of the temperature probe and independent of the actual value of the probe temperature, the switching means being coupled to the control electrode of the controlled switch for controlling the operation thereof in a sense to limit the power supplied to the load.

13. An apparatus for sensing and regulating the temperature of an enclosed area comprising, a temperature probe adapted to be located within said enclosed area so as to be responsive solely to the ambient temperature thereof, a pair of input terminals for connection to a source of electric energy, a controlled switch having a control electrode, means for connecting the controlled switch in series with a heating load across said input terminals, a voltage comparator having first and second inputs coupled to said temperature probe and to a source of reference voltage, respectively, and an output coupled to the control electrode of the controlled switch for controlling the on/off time of the switch, a switching means controlled by a signal developed in response to a rapid decrease in the temperature of the temperature probe and coupled to the control electrode of the controlled switch for controlling the operation thereof in a sense to limit the power supplied to the load, and a network having a relatively large time constant for coupling the signal developed by the temperature probe to an input of the switching means whereby the switching means is nonresponsive to signals developed for relatively slow variations of said ambient temperature but switches state upon receipt of said signal developed in response to said rapid decrease of temperature of the temperature probe.

14. An apparatus for sensing and regulating the temperature of an enclosed area comprising, a temperature probe adapted to be located within said enclosed area so as to be responsive solely to the ambient temperature thereof, a pair of input terminals for connection to a source of electric energy, a controlled switch having a control electrode, means for connecting the controlled switch in series with a heating load across said input terminals, a voltage comparator having first and second inputs coupled to said temperature probe and to a source of reference voltage, respectively, and an output coupled to the control electrode of the controlled switch for controlling the on/off time of the switch, a switching means controlled by a signal developed in response to a rapid decrease in the temperature of the temperature probe and coupled to the control electrode of the controlled switch for controlling the operation thereof in a sense to limit the power supplied to the load, a network having a relatively large time constant, and wherein the switching means comprise a second voltage comparator having an output coupled to a switching device which is coupled between the output of the first voltage comparator and the control electrode of the controlled switch, and said second voltage comparator further comprises first and second inputs coupled to said temperature probe via a threshold voltage source and via said time constant network, respectively, whereby the second voltage comparator only switches state for signals developed in response to said rapid decrease of temperature of the temperature probe.

15. An apparatus as claimed in claim 16 wherein the threshold voltage source includes means for deriving first and second voltages and a switch controlled by the output of the second voltage comparator for selectively switching said first and second voltages to said first input of the second voltage comparator as a function of the state of the second voltage comparator.

16. An apparatus as claimed in claim 17 wherein said first and second derived voltages have opposite polarity and the second voltage comparator has first and second stable states corresponding to said first and second opposite polarity voltages, respectively.

* * * * *

UNITED STATES PATENT AND TRADEMARK OFFICE
CERTIFICATE OF CORRECTION

PATENT NO. : 4,338,511
DATED : July 6, 1982
INVENTOR(S) : JEAN-CLAUDE G. SIX

It is certified that error appears in the above-identified patent and that said Letters Patent is hereby corrected as shown below:

Claim 6, line 2, after "comprise" change "and" to --an--

Claim 10, line 2, delete "by"

Claim 15, line 1, change "16" to --14--

Claim 16, line 1, change "17" to --15--

Signed and Sealed this

Seventh Day of May 1985

[SEAL]

Attest:

DONALD J. QUIGG

Attesting Officer     Acting Commissioner of Patents and Trademarks